(12) United States Patent
Ito

(10) Patent No.: US 8,223,710 B2
(45) Date of Patent: Jul. 17, 2012

(54) COMMUNICATION METHOD AND TERMINAL APPARATUS USING THE COMMUNICATION METHOD

(75) Inventor: Kiyoshige Ito, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 172 days.

(21) Appl. No.: 12/596,299

(22) PCT Filed: Apr. 9, 2008

(86) PCT No.: PCT/JP2008/000927
§ 371 (c)(1),
(2), (4) Date: Apr. 1, 2010

(87) PCT Pub. No.: WO2008/132788
PCT Pub. Date: Nov. 6, 2008

(65) Prior Publication Data
US 2010/0182948 A1  Jul. 22, 2010

(30) Foreign Application Priority Data
Apr. 16, 2007 (JP) ................................. 2007-107229

(51) Int. Cl.
*H04W 4/00* (2009.01)
(52) U.S. Cl. ....................................... 370/329; 709/227
(58) Field of Classification Search .................. 370/328, 370/329; 709/227
See application file for complete search history.

(56) References Cited

U.S. PATENT DOCUMENTS

2004/0218620 A1* 11/2004 Palm et al. ..................... 370/445
2009/0067366 A1* 3/2009 Aust et al. ..................... 370/328

FOREIGN PATENT DOCUMENTS

JP  2004-007351  1/2004
JP  2004-215064  7/2004

OTHER PUBLICATIONS

Japanese Notification of Reason(s) for Refusal, w/ English translation thereof, issued in Japanese patent Application No. JP 2007-107229 dated Apr. 5, 2011.
K. Mase et al., "Ad Hoc Networks," Technical Survey, vol. 84, No. 2. pp. 127-134, 2001; w/ English translation.
International Search Report issued in International Patent Application No. PCT/JP2008/000927 dated Jul. 15, 2008.
International Preliminary Examination Report on Patentability (I) w/ an English Translation thereof issued in International Application No. PCT/JP2008/000927 dated Nov. 19, 2009.

* cited by examiner

Primary Examiner — Jung Park
(74) Attorney, Agent, or Firm — DC Patent Lawyers, PLLC

(57) ABSTRACT

A wireless unit 12 through a processing unit 16 communicate while forming an ad hoc network with other terminal apparatuses. A control unit 18 receives, when being assigned a role of approving participation of a new terminal apparatus in an ad hoc network, a participation request from a new terminal apparatus over a predetermined period after the execution of the role is requested and performs an approval process. The control unit 18 calculates the number of new terminal apparatuses at this time that have been approved. The control unit 18 gives notification of the result of calculation in addition to giving notification of the result of the approval process.

2 Claims, 6 Drawing Sheets

| DESTINATION ADDRESS /30 | HOP-DESTINATION ADDRESS /32 | HOP NUMBER /34 | ... |
|---|---|---|---|
| A1 | B1 | C1 | ... |
| A2 | B1 | C1 | ... |
| | | | |
| AM | BL | CK | ... |

20

# COMMUNICATION METHOD AND TERMINAL APPARATUS USING THE COMMUNICATION METHOD

RELATED APPLICATIONS

This application is the U.S. National Phase under 35 U.S.C. §371 of International Application No. PCT/JP2008/000927, filed on Apr. 9, 2008, which in turn claims the benefit of Japanese Application No. 2007-107229, filed on Apr. 16, 2007, the disclosures of which Applications are incorporated by reference herein.

TECHNICAL FIELD

The present invention relates to communication technology and particularly to a communication method in an ad hoc network and to a terminal apparatus using the communication method.

BACKGROUND ART

An ad hoc network does not depend on any base station apparatus or wired network and is an autonomous distributed network including a terminal apparatus as a constituent element. In an ad hoc network, terminal apparatuses are equal to one another, and information exchange is carried out by implementing multi-hop networking. Routing methods for such ad hoc networks include a table driving method, an on-demand method, and a hybrid method. In a table driving method, each terminal apparatus holds a routing table storing the destination of a packet signal in relation with a next-hop destination. The terminal apparatus also determines the next-hop destination from the destination of a packet signal by referring to the routing table. The routing table is periodically updated by a control packet signal. Examples of a table driving method include DSDV (Destination Sequence Distance Vector), WRP (Wireless Routing Protocol), CGSR (Cluster-head Gateway Switch Routing), and OLSR (Optimized Link State Routing).

In an on-demand method, a terminal apparatus of information generation source finds a route to a destination when requesting the transfer of a packet signal. The terminal apparatus of information generation source learns a reverse route to the terminal apparatus of information generation source by transferring a packet signal for inquiry by using a flooding method, and a destination terminal apparatus that has received the packet signal for inquiry responds. Based on a route found in such a manner, a packet signal is transferred from a terminal apparatus of a generation source to a destination terminal apparatus. Examples of an on-demand method include AODV (Ad hoc On demand Distance Vector), DSR (Dynamic Source Routing), TORA (Temporally Ordered Routing Algorithm), RDMAR (Relative Distance Micro-discovery Ad hoc Routing Protocol), and ABR (Associativity-Based Routing). A hybrid method is a combination method of the table driving method and the on-demand method.

In an ad hoc network, a technique has been suggested for simplifying the settings of terminal apparatuses. A predetermined terminal apparatus retains communication setting information, and a tag is held over near an IC card reader/writer mounted on the terminal apparatus. As a result, by having noncontact communication with a tag, the IC card reader/writer transmits the communication setting information. By performing in reverse the above-stated procedure between the tag and an IC card reader/writer mounted on another terminal apparatus, the communication setting information is transmitted to the terminal apparatus.

DISCLOSURE OF INVENTION

Technical Problem

In consideration of being user friendly, the procedure of a terminal apparatus for connecting to an ad hoc network is desirably simple. On the other hand, since an ad hoc network is formed by a plurality of terminal apparatuses, security measures are necessary in consideration of the influence on other terminal apparatuses. In order to improve the security, a role of approving the participation of a new terminal apparatus in the ad hoc network is assigned to any one of the plurality of terminal apparatuses forming the ad hoc network (hereinafter, the terminal apparatus to which the role is assigned is referred to as a "registrar"). In order to improve the simplicity of the connecting procedure, the connecting procedure is performed when a button provided to a new terminal apparatus is pushed down within a predetermined period after a button provided to the registrar is pushed down.

In this background, the inventor has come to realize the following problem. In the above-stated connecting procedure, if multiple new terminal apparatuses are connectable within a predetermined period after a button provided to the registrar is pushed down, there is a possibility that a terminal apparatus of a nefarious user will be connected to the network. In order to reduce the influence by the terminal apparatus of a nefarious user, the connection of such a terminal apparatus is desirably detected.

In this background, a general purpose of the present invention is to provide a communication technology for suppressing the lowering of the security while simplifying the procedure for connecting to an ad hoc network.

Means for Solving the Problem

In order to solve the problem, a terminal apparatus according to an embodiment of the present invention comprises: a communication unit operative to communicate while forming an ad hoc network with other terminal apparatuses; a reception unit operative, when being assigned a role of approving participation of a new terminal apparatus in an ad hoc network formed by the communication unit, to receive a participation request from a new terminal apparatus via the communication unit over a predetermined period after the execution of the role is requested; a processing unit operative to perform an approval process on the participation request received by the reception unit; and a notification unit operative to give notification of the result of the approval process performed by the processing unit. The processing unit calculates the number of new terminal apparatuses that have been approved, and the notification unit gives notification of the result of calculation.

Another embodiment of the present invention relates to a communication method. The method comprises: communicating while forming an ad hoc network with other terminal apparatuses; receiving, when being assigned a role of approving participation of a new terminal apparatus in a formed ad hoc network, a participation request from a new terminal apparatus over a predetermined period after the execution of the role is requested; performing an approval process on the received participation request; and giving notification of the result of the performed approval process. In performing the approval process, the number of new terminal apparatuses that have been approved is calculated, and in giving the notification, notification is given of the result of calculation.

Optional combinations of the aforementioned constituting elements, and implementations of the invention in the form of methods, apparatuses, systems, recording mediums, and computer programs may also be practiced as additional modes of the present invention.

EFFECT OF THE INVENTION

According to the present invention, the lowering of security can be suppressed while simplifying the procedure for connecting to an ad hoc network.

BRIEF DESCRIPTION OF DRAWINGS

FIG. 3 is a diagram illustrating the data structure of a routing table stored in the memory unit shown in FIG. 2;

Figure 1:
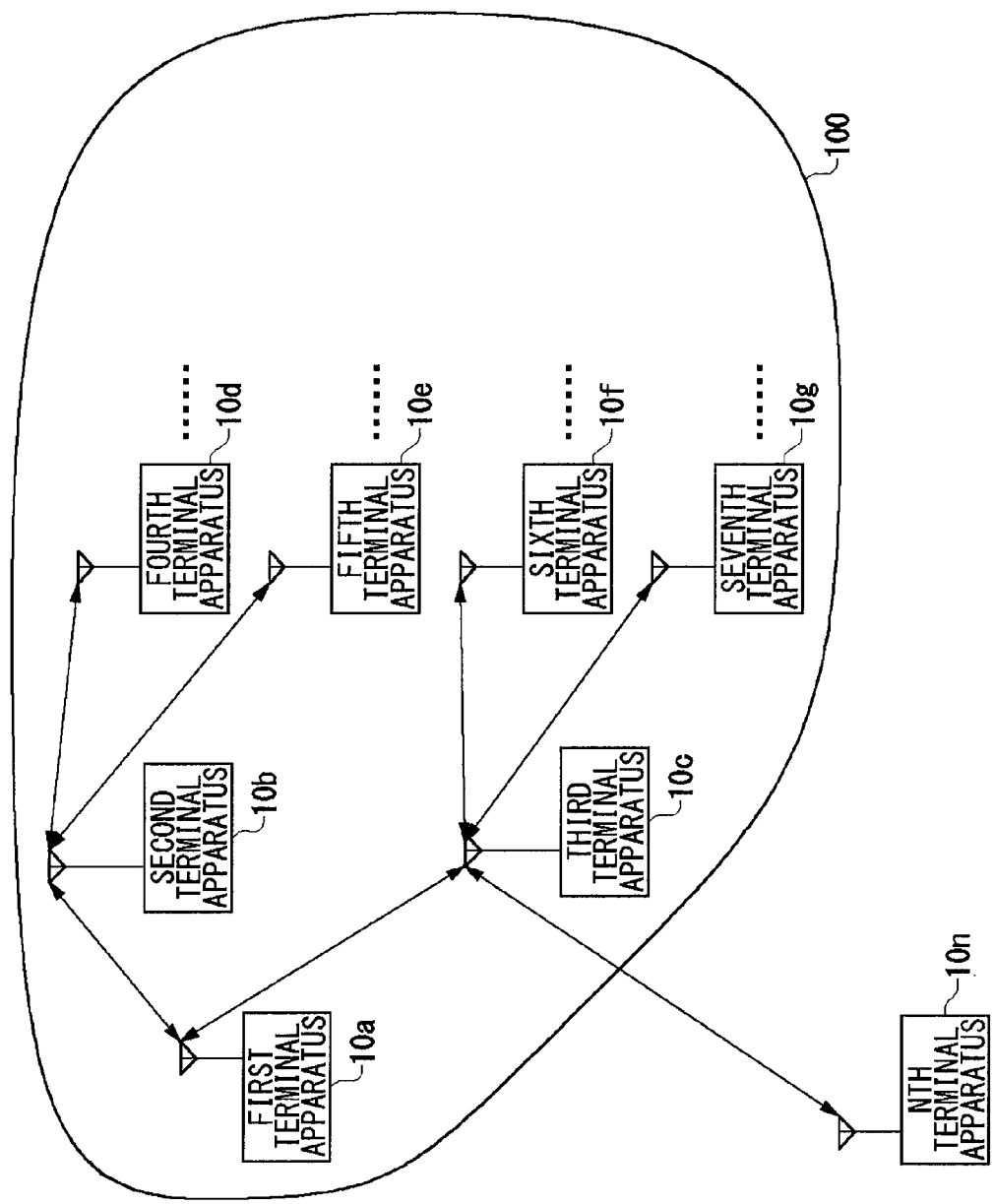
FIG. 1 is a diagram illustrating the configuration of a communication system according to an embodiment of the present invention.

EXPLANATION OF REFERENCE 10 terminal apparatus
12 wireless unit
14 modem unit
16 processing unit
18 control unit
20 memory unit
22 operation unit
24 monitor
26 speaker
100 communication system

BEST MODE FOR CARRYING OUT THE INVENTION

An outline of the present invention will be given before a specific description thereof. Exemplary embodiments of the present invention relate to a communication system that executes an ad hoc network formed by multiple terminal apparatuses. In an ad hoc network, any one of the multiple terminal apparatuses is determined to be the above-stated registrar. As previously described, if multiple new terminal apparatuses are connectable within a predetermined period after a button provided to the registrar is pushed down, there is a possibility that a terminal apparatus of a nefarious user is connected to the network, and security is thus lowered. In order to suppress such lowering of security, the communication system according to the present exemplary embodiment carries out the following process.

Upon the button being pushed down, a terminal apparatus, which is a registrar, goes into a state where the apparatus can execute an approval process (hereinafter, referred to as "approval mode"). Upon the receipt of a participation request from a new terminal apparatus while being in the approving mode, the registrar allows the participation of the new terminal apparatus after performing the approving process. The registrar calculates the number of terminal apparatuses the registrar has approved after going into the approval mode. Furthermore, the registrar notifies a user of the calculation result. The user can recognize the number of terminal apparatuses that have newly joined in the ad hoc network by the above-stated processes.

A communication system mainly performs: (1) a process of connecting a new terminal apparatus to an ad hoc network (hereinafter, referred to as "connection process"); (2) a process of generating a routing table for the ad hoc network (hereinafter, referred to as "generation process"); and (3) a process of transferring a data signal in the ad hoc network based on the routing table (hereinafter, referred to as "transfer process"). The previously-stated approval process is included in the connection process of the item (1).

FIG. 1 shows the configuration of a communication system 100 according to the embodiment of the present invention. The communication system 100 includes a first terminal apparatus 10*a*, a second terminal apparatus 10*b*, a third terminal apparatus 10*c*, a fourth terminal apparatus 10*d*, a fifth terminal apparatus 10*e*, a sixth terminal apparatus 10*f*, and a seventh terminal apparatus 10*g*, which are all generically called a terminal apparatus 10. An Nth terminal apparatus 10*n* is about to be included in the communication system 100.

Multiple terminal apparatuses 10, for example, the first terminal apparatus 10*a* through the seventh terminal apparatus 10*g*, communicate by forming an ad hoc network. The terminal apparatus 10 constituting the ad hoc network is not limited to the first terminal apparatus 10*a* through the seventh terminal apparatus 10*g*. The multiple terminal apparatuses 10, for example, correspond to a wireless LAN system that complies with standards such as IEEE 802.11. As previously described, routing methods for ad hoc networks need to correspond to publicly-known techniques such as a table driving method, an on-demand method, and a hybrid method. For example, in the case of corresponding to a table driving method, a routing table is updated by a publicly-known technique.

In addition to a communication function in a normal ad hoc network, a role of approving the participation of a new terminal apparatus 10 in the ad hoc network is assigned to any one of multiple terminal apparatuses 10, for example, the third terminal apparatus 10*c*. In other words, the third terminal apparatus 10*c* corresponds to the previously-stated registrar. A registrar can be described as a component having an authorization to issue or cancel a qualification to participate in an ad hoc network. The processes performed in the registrar will hereinafter be described in detail. The function of the registrar is provided to the terminal apparatuses 10 other than the third terminal apparatus 10*c*; however, the function is assumed to be inactive under the present circumstances. In order to clarify the explanation, it is assumed that one registrar is included in the communication system 100.

The new terminal apparatus 10, in other words, the Nth terminal apparatus 10*n* requests participation in the ad hoc network formed by the multiple terminal apparatuses 10. The Nth terminal apparatus 10*n* makes a request to the registrar for participation. When participation is allowed by the registrar, the Nth terminal apparatus 10*n* becomes a component of the communication system 100. In the following explanation, the Nth terminal apparatus 10*n* and the registrar may be referred to as a "requestor" and a "responder," respectively, for convenience sake.

Figure 2:
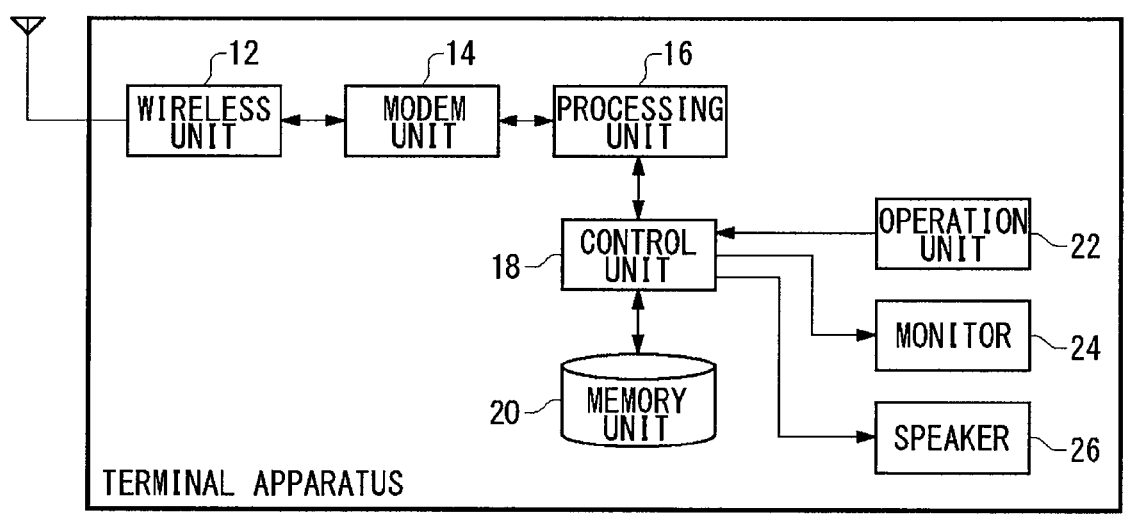
FIG. 2 is a diagram illustrating the configuration of the terminal apparatus shown in FIG. 1.

FIG. 2 shows the configuration of the terminal apparatus 10. The terminal apparatus 10 includes a wireless unit 12, a modem unit 14, a processing unit 16, a memory unit 20, an operation unit 22, a monitor 24, and a speaker 26. FIG. 1 shows the multiple terminal apparatuses 10 and further shows terminal apparatuses 10 that correspond to a requestor and to a responder. All the terminal apparatuses 10 have configurations as shown in FIG. 2.

The wireless unit 12 performs communication while forming an ad hoc network with other terminal apparatuses 10. The wireless unit 12 performs frequency conversion on a wireless frequency signal received via an antenna and generates a baseband signal, acting as a reception process. Furthermore, the wireless unit 12 outputs the baseband signal to the modem unit 14. In general, a baseband signal is formed by both an in-phase component and a quadrature component, and two signal lines should thus be shown. However, for the purpose of clarifying the figure, only one signal line is shown. The wireless unit 12 also includes an LNA (Low Noise Amplifier), a mixer, an AGC, and an A/D converter.

The wireless unit 12 performs frequency conversion on a baseband signal input from the modem unit 14 and generates a wireless frequency signal, acting as a transmission process. Furthermore, the wireless unit 12 transmits the wireless frequency signal from an antenna. The wireless unit 12 also includes a PA (Power Amplifier), a mixer, and a D/A converter.

The modem unit 14 performs demodulation on the baseband signal from the wireless unit 12, acting as a reception process. Furthermore, the modem unit 14 outputs the result of demodulation to the processing unit 16. The modem unit 14 performs modulation on a signal from the processing unit 16, acting as a transmission process.

Furthermore, the modem unit 14 outputs the result of modulation to the wireless unit 12 as a baseband signal. When the terminal apparatus 10 corresponds to an OFDM modulation scheme such as the IEEE802.11a standard, the modem unit 14 performs FFT, which acts as a reception process and performs IFFT, which acts as a transmission process. When the terminal apparatus 10 corresponds to a spread spectrum scheme such as the IEEE802.11b standard, the modem unit 14 performs despreading, which acts as a reception process, and performs spreading, which acts as a transmission process. Moreover, when the terminal apparatus 10 corresponds to an MIMO scheme such as an IEEE802.11n, the modem unit 14 performs adaptive array signal processing, which acts as a reception process and performs distributed processing on multiple streams, which acts as a transmission process.

The processing unit 16 performs digital signal processing on the signal from the modem unit 14 and on the signal to the modem unit 14. An example of the digital signal processing is error correction coding, acting as a transmission process or error correction decoding, acting as a reception process. The digital signal processing is not limited to these processes. The processing unit 16 outputs to the control unit 18 the result of performing digital signal processing on the signal from the modem unit 14 and inputs from the control unit 18 a signal used as a basis for the signal to the modem unit 14.

The control unit 18 controls the overall movement of the terminal apparatus 10. The processes performed by the control unit 18 are mainly classified into: (1) a connection process; (2) a generation process; (3) a transfer process, which are all previously stated, and (4) an input and output data process. For the sake of ease of explanation, the explanation is given in the order of items (4), (2), and (3) and then the item (1) at the end. First, the explanation is given of the item (4), the input and output data process. The control unit 18 receives the result of digital signal processing from the processing unit 16, acting as an output process, and outputs the result to a monitor 24 and a speaker 26. The control unit 18 receives an instruction signal from the operation unit 22, acting as an input process and outputs corresponding data to the processing unit 16. The operation unit 22 is constituted with a button and the like. When the terminal apparatus 10 is formed so as to be connected with a personal computer, the operation unit 22 may be a keyboard or a mouse, which is provided with the personal computer.

The explanation is now given of the item (2), the generation process. As previously described, publicly-known techniques need to be used for the generation of a routing table. The control unit 18 stores a generated routing table in the memory unit 20. FIG. 3 shows the data structure of a routing table stored in the memory unit 20. As shown in the figure, the routing table includes a destination address column 30, a hop-destination address column 32, and a hop number column 34. The routing table may include other information. In the figure, the addresses are shown as "A1," "B1," etc., in the destination address column 30 and in the hop-destination address column 32. In reality, the addresses are shown by, for example, IP addresses. The same applies to the hop number in the hop number column 34. FIG. 2 is referred back again.

The explanation is now given of the item (3), the transfer process. As previously described, publicly-known techniques need to be used for the transfer process. The control unit 18 acquires the destination address of a packet signal received via the wireless unit 12 through the processing unit 16. The control unit 18 identifies the hop-destination address that corresponds to an acquired destination address by referring to the routing table stored in the memory unit 20. Moreover, the control unit 18 transmits a packet signal to the identified hop-destination address via the processing unit 16 through the wireless unit 12.

The explanation is now given of the item (1), the connection process. The connection process is performed by the terminal apparatus 10 of the requestor and the terminal apparatus 10 of the responder. The explanation is given of the process of the control unit 18 in the terminal apparatus 10 of the requestor, followed by the explanation of the process of the control unit 18 in the terminal apparatus 10 of the responder. The terminal apparatus 10 of the requestor corresponds to the Nth terminal apparatus 10n of FIG. 1, and the terminal apparatus 10 of the responder corresponds to the third terminal apparatus 10c of FIG. 1.

The control unit 18 in the terminal apparatus 10 of the requestor enters into a request mode upon detection of the button of the operation unit 22 being pushed down by a user. Once entering the request mode, the control unit 18 controls the processing unit 16 through the wireless unit 12 so as to transmit to a registrar a packet signal indicating a request for participating in an ad hoc network (hereinafter, referred to as "request signal"). The wireless unit 12 through the processing unit 16 receive from the registrar to which the request signal has been transmitted a packet signal indicating the approval for the participation (hereinafter, referred to as "enabling signal"). An enabling signal is input to the control unit 18. As a result, the control unit 18 enters into a communication mode. Once entering into the communication mode, the control unit 18 controls the wireless unit 12 through the processing unit 16 so that a communication is performed by participating in an ad hoc network.

The control unit 18 in the terminal apparatus 10 of the responder enters an approval mode upon detecting that the predetermined button of the operation unit 22 is pushed down by a user. The approval mode is a state where an approval process can be performed. Once entering into the approval mode, the control unit 18 receives a request signal from the terminal apparatus 10 of the requestor over a predetermined period via the wireless unit 12 through the processing unit 16.

The control unit 18 performs the approval process on the received request signal. Publicly-known techniques need to be used for the approval process. For example, the control unit 18 performs a recognition process and an identification process on the terminal apparatus of the requestor after exchanging a public key with the terminal apparatus 10 of the requestor via the wireless unit 12 through the processing unit 16. A "device password" needs to be used for the recognition process.

When the participation is approved, the control unit 18 transmits an enabling signal to the terminal apparatus 10 of the requestor via the processing unit 16 through the wireless unit 12. On the other hand, when the participation is rejected, the control unit 18 transmits a rejection signal to the terminal apparatus 10 of the requestor via the processing unit 16 through the wireless unit 12. After a certain period, the control unit 18 enters a communication mode. Once entering into the communication mode, the control unit 18 controls the wireless unit 12 through the processing unit 16 so that a communication is performed by participating in an ad hoc network.

The configuration is implemented in hardware by any CPU of a computer, memory, or other LSI's and in software by a program having a communication function or the like loaded into the memory. Functional blocks are implemented by the cooperation of hardware and software. Thus, a person skilled in the art should appreciate that there are many ways of accomplishing these functional blocks in various forms in accordance with the components of hardware only, software only, or the combination of both.

Figure 4:
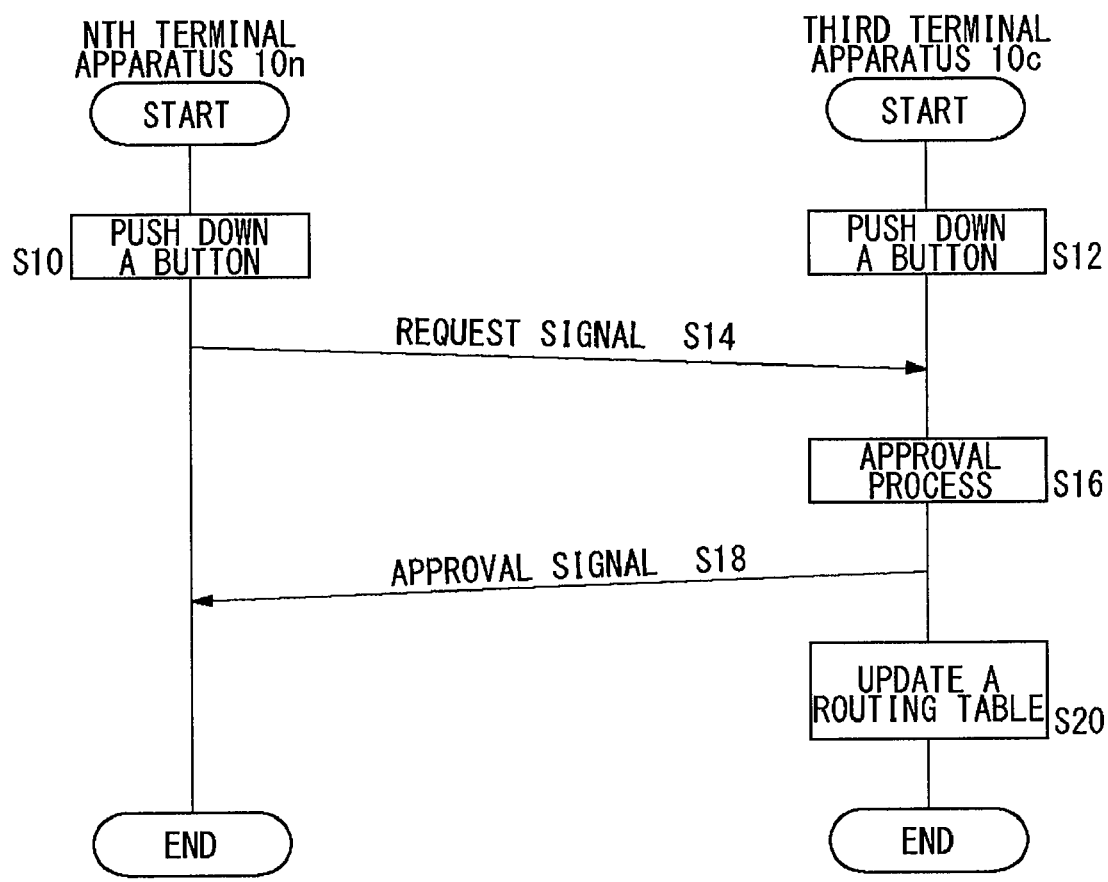
FIG. 4 is a sequence diagram illustrating a connecting procedure in the communication system shown in FIG. 1.

The explanation is given of the movement of the communication system 100 having the above-stated configuration. FIG. 4 is a sequence diagram showing a connecting procedure in the communication system 100. The button of the Nth terminal apparatus 10n is pushed down (S10), and the button of the third terminal apparatus 10c is pushed down (S12). The Nth terminal apparatus 10n transmits a request signal to the third terminal apparatus 10c (S14). The third terminal apparatus 10c performs the approval process on the Nth terminal apparatus 10n (S16). The third terminal apparatus 10c transmits an enabling signal to the Nth terminal apparatus 10n (S18). The third terminal apparatus 10c updates a routing table (S20).

The detailed explanation is given in the following of the item (1), the connection process, in the terminal apparatus 10 of the responder. As previously described, the control unit 18 enters into an approval mode and stays in the mode over a predetermined period upon detecting that the button of the operation unit 22 is pushed down. The predetermined period is defined to be, for example, "120 seconds." When the control unit 18 performs the approval process on a certain terminal apparatus 10, the predetermined period is restarted at the end of the approval process. In other words, the period of the approval mode is extended when the approval process is performed on multiple terminal apparatuses 10. Such a process allows the connection process to be performed on multiple terminal apparatuses 10 of the requestors when the button of the terminal apparatus 10 of the responder is once pushed down by a user. Therefore, a process to be performed by a user can be further simplified.

However, when multiple terminal apparatuses 10 of the requestors can be connected by one push of the button of the terminal apparatus 10 of the responder, there is a possibility that a terminal apparatus 10 that should not be connected in the first place is connected in the same manner as the terminal apparatus 10 of a nefarious user. Under such a circumstance, the terminal apparatus 10 of the responder is configured as shown in the following in order to suppress the lowering of the security of the communication system 100.

The control unit 18 calculates the number of terminal apparatuses 10 for which the connection is approved after entering into the approval mode by the pushing-down of the button of the operation unit 22. The number can be considered as the number of new terminal apparatuses 10 that are approved during one period of the approval mode. The control unit 18 resets a counter upon the termination of the approval mode. Moreover, the control unit 18 notifies a user of a calculation result by displaying the calculated number of the terminal apparatuses 10 on the monitor 24. The calculated number of terminal apparatuses 10 may be displayed in real time or may be displayed as a final result after the approval mode is terminated.

Figure 5:
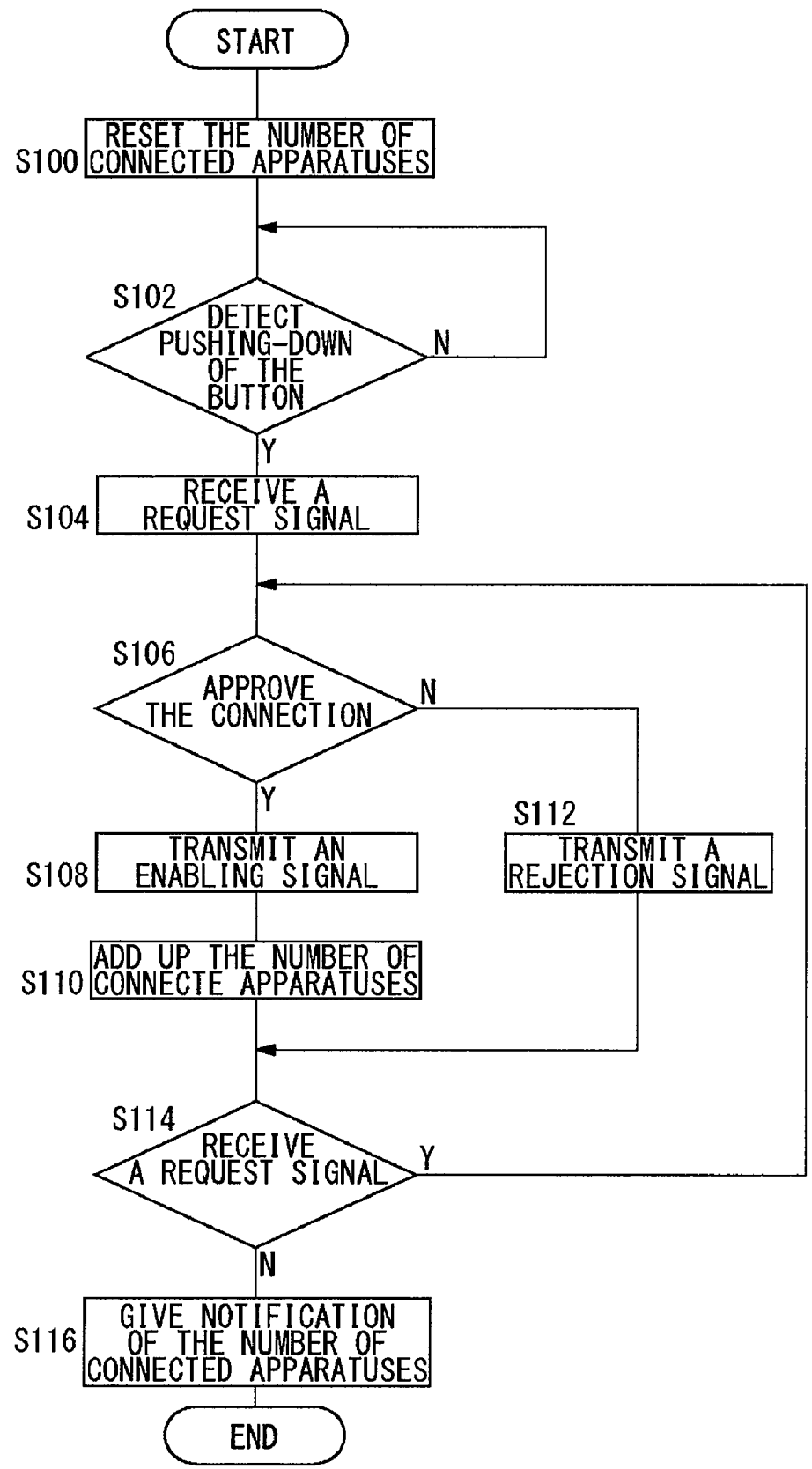
FIG. 5 is a flowchart illustrating a connecting procedure in the terminal apparatus shown in FIG. 2.

FIG. 5 is a flowchart illustrating a connecting procedure in the terminal apparatus 10. The control unit 18 resets the number of connected apparatuses (S100). The control unit 18 stands by if no push of the button of the operation unit 22 is detected (N in S102). On the other hand, the control unit 18 enters into the approval mode when the button of the operation unit 22 is detected as begin pushed down (Y in S102) and receives a request signal from the terminal apparatus 10 of the requestor via the wireless unit 12 through the processing unit 16 (S104). When the connection of the terminal apparatus 10 of the requestor is approved (Y in S106), the control unit 18 transmits an enabling signal to the terminal apparatus 10 of the requestor via the processing unit 16 through the wireless unit 12 (S108). The control unit 18 adds up the number of connected apparatuses (S110).

On the other hand, if the connection of the terminal apparatus 10 of the requestor is not approved (N in S106), the control unit 18 transmits a rejection signal to the terminal apparatus 10 of the requestor via the processing unit 16 through the wireless unit 12 (S112). The control unit 18 goes back to Step 106 upon the further reception of a request signal from another terminal apparatus 10 of the requestor via the wireless unit 12 through the processing unit 16 (Y in S114). On the other hand, the control unit 18 gives notification of the number of the connected apparatuses via the operation unit 22 (S116) if no further request signal from another terminal apparatus 10 of the requestor is received via the wireless unit 12 through the processing unit 16 (N in S114). The process, on other words, the approval mode is terminated after this.

The explanation is given in the following of another embodiment of the item (1), the connection process, in the terminal apparatus 10 of the responder. However, when multiple terminal apparatuses 10 of the requestors can be connected by one push of the button of the terminal apparatus 10 of the responder, there is a possibility that a terminal apparatus 10 that should not be connected in the first place is connected in the same manner as the terminal apparatus 10 of a nefarious user. The control unit 18 defines in advance a threshold value concerning the terminal apparatuses 10 that can be approved in one approval mode. The threshold value is defined to be, for example, "5." The control unit 18 calculates the number of terminal apparatuses 10 for which the connection is approved after entering the approval mode by the push of the button of the operation unit 22. The control unit 18 compares the pre-set threshold value and the calculated number. Moreover, the control unit 18 cancels the approval of the terminal apparatuses 10 that have been approved during the approval mode when the calculated number is larger than the pre-set threshold value.

The cancellation of the approval needs to be conducted by publicly-known techniques. For example, the control unit 18 makes a list of IP addresses for identifying the terminal apparatus 10 that has been approved during the approval mode and transmits the list to other terminal apparatuses 10 included in the communication system 100 via the processing unit 16 through the wireless unit 12. The control unit 18 transmits an instruction signal indicating that a data signal from the terminal apparatuses 10 included in the list is not transferred. Moreover, the control unit 18 notifies a user of a comparison result by displaying on the monitor 24 the information indicating that the approval has been cancelled. The control unit 18 may light an LED (not shown in FIG. 2) or output a warning tone from the speaker 26 when the calculated number is larger than the pre-set threshold value.

Figure 6:
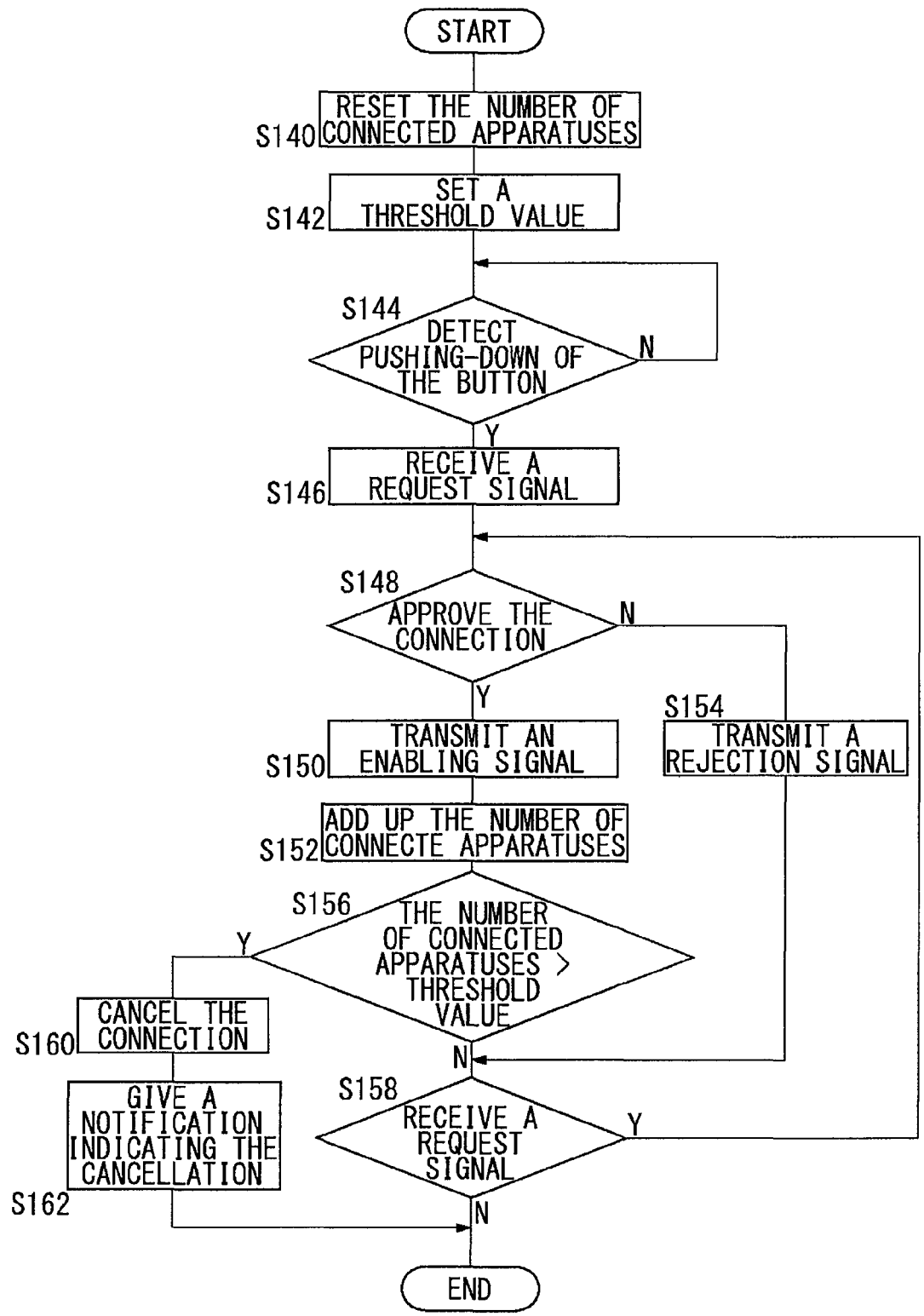
FIG. 6 is a flowchart illustrating another connecting procedure in the terminal apparatus shown in FIG. 2.

FIG. 6 is a flowchart illustrating another connecting procedure in the terminal apparatus 10. In addition to resetting the number of connected apparatuses (S140), the control unit 18 sets a threshold value (S142). The control unit 18 stands by if no pushing-down of the button of the operation unit 22 is detected (N in S144). On the other hand, the control unit 18 enters into the approval mode when the button of the operation unit 22 is detected as begin pushed down (Y in S144) and receives a request signal from the terminal apparatus 10 of the requestor via the wireless unit 12 through the processing unit 16 (S146). When the connection of the terminal apparatus 10 of the requestor is approved (Y in S148), the control unit 18 transmits an enabling signal to the terminal apparatus 10 of the requestor via the processing unit 16 through the wireless unit 12 (S150). The control unit 18 adds up the number of connected apparatuses (S152). When the number of the connected apparatuses is not larger than the pre-set threshold value (N in S156), the control unit 18 goes back to Step 148 upon the further reception of a request signal from another terminal apparatus 10 of the requestor via the wireless unit 12 through the processing unit 16 (Y in S158). On the other hand, when the control unit 18 receives no further request signal from another terminal apparatus 10 of the requestor via the wireless unit 12 through the processing unit 16 (N in S158), the process, that is, the approval mode is terminated.

The control unit 18 cancels the connection (S160) when the number of the connected apparatuses is larger than the pre-set threshold value (Y in S156). The control unit 18 gives notification via the processing unit 16 through the wireless unit 12 to the terminal apparatuses 10 included in the communication system 100 indicating the cancellation (S162) and ends the process, that is, the approval mode. On the other hand, if the connection of the terminal apparatus 10 of the requestor is not approved (N in S148), the control unit 18 transmits a rejection signal to the terminal apparatus 10 of the requestor via the processing unit 16 through the wireless unit 12 (S154). The control unit 18 goes back to Step 148 upon further reception of a request signal from another terminal apparatus 10 of the requestor via the wireless unit 12 through the processing unit 16 (Y in S158). On the other hand, when the control unit 18 receives no further request signal from another terminal apparatus 10 of the requestor via the wireless unit 12 through the processing unit 16 (N in S158), the process, that is, the approval mode is terminated.

According to the exemplary embodiments of the present invention, since connection is approved for multiple terminal apparatuses over a predetermined period after a button is pushed down and notification is given of the number of approved apparatuses, the lowering of security can be suppressed while simplifying the procedure for connecting to an ad hoc network. Also, since notification is given of the number of approved apparatuses, the possibility can be suggested that the terminal apparatus of a nefarious user is connected. The number of approved apparatuses and the threshold value are compared and notification is then given of the result of comparison. Thus, the possibility can be suggested more clearly of a terminal apparatus of a nefarious user being connected. When the number of approved apparatuses is larger than the threshold value, the approval is cancelled. Thus, the terminal apparatus of a nefarious user can be eliminated.

Described above is an explanation based on the exemplary embodiments of the present invention. These exemplary embodiments are intended to be illustrative only and it will be obvious to those skilled in the art that various modifications to constituting elements and processes could be developed and that such modifications are also within the scope of the present invention.

In the exemplary embodiments of the present invention, the terminal apparatus 10 performs both the connection process and the transfer process while using the same wireless unit 12 and the modem unit 14. In other words, the both processes are performed while using a wireless LAN. However, the embodiment is not limited to this example. For example, another wireless unit 12 and modem unit 14 may be used for the connection process and the transfer process. In other words, while a wireless LAN is used for the transfer process, another communication system may be used for the connection process, or vice versa. The exemplary embodiments allow the degree of freedom of the configuration of a communication system to be improved.

In the exemplary embodiments of the present invention, the control unit 18 notifies a user of the result of calculation and the result of comparison by displaying those results on the monitor 24. However, the embodiment is not limited to this example. For example, the control unit 18 may transmit the result of calculation and the result of comparison to other terminal apparatuses 10 via the processing unit 16 through the wireless unit 12. In this case, the result of calculation and the result of comparison are notified to the users using other terminal apparatuses 10. The exemplary variation allows the lowering of security to be suppressed since the result of calculation and the result of comparison are notified to multiple users.

[Industrial applicability]

According to the present invention, the lowering of security can be suppressed while simplifying the procedure for connecting to an ad hoc network.

The invention claimed is:

1. A terminal apparatus comprising:
a communication unit operative to communicate while forming an ad hoc network with other terminal apparatuses;
a reception unit operative, when being assigned a role of approving participation of a new terminal apparatus in an ad hoc network formed by the communication unit, to receive a participation request from a new terminal apparatus via the communication unit over a predetermined period after the execution of the role is requested by entering an approval mode;
a processing unit operative to perform an approval process on the participation request received by the reception unit; and
a notification unit operative to give notification of the result of the approval process performed by the processing unit, wherein
the processing unit extends the predetermined period when the processing unit approves a new terminal apparatus,
the processing unit calculates the number of new terminal apparatuses that have been approved in the predetermined period, compares a pre-set threshold value and a calculated number, and cancels the approval when the calculated number is larger than the pre-set threshold value, and the communication unit participates in the ad hoc network and performs communication after the predetermined period.

2. A communication method comprising:

communicating while forming an ad hoc network with other terminal apparatuses;

receiving, when being assigned a role of approving participation of a new terminal apparatus in a formed ad hoc network, a participation request from a new terminal apparatus over a predetermined period after the execution of the role is requested by entering an approval mode;

performing an approval process on the received participation request; and giving notification of the result of the performed approval process, wherein in performing the approval process, the predetermined period is extended when a new terminal apparatus is approved, in performing the approval process, the number of new terminal apparatuses that have been approved in the predetermined period is calculated, a pre-set threshold value and a calculated number are compared, and the approval is canceled when the calculated number is larger than the pre-set threshold value, and the ad hoc network is participated in and communication is performed after the predetermined period.

* * * * *